United States Patent [19]
Friberg

[11] 3,934,130
[45] Jan. 20, 1976

[54] DIGITAL DIFFERENTIAL ANALYZER

[75] Inventor: Richard Lynn Friberg, Waynesboro, Va.

[73] Assignee: General Electric Company, Salem, Va.

[22] Filed: Aug. 22, 1974

[21] Appl. No.: 499,509

[52] U.S. Cl. .................... 235/150.31; 235/151.11
[51] Int. Cl.[2] .......................................... G06J 1/02
[58] Field of Search ........... 235/150.31, 151.11, 152

[56] References Cited
UNITED STATES PATENTS

| | | | |
|---|---|---|---|
| 3,148,273 | 9/1964 | Truitt et al. | 235/150.31 |
| 3,598,974 | 8/1971 | Lincoln | 235/150.31 |
| 3,701,890 | 10/1972 | Dummermuth | 235/150.31 |
| 3,715,562 | 2/1973 | Dendy et al. | 235/150.31 |

Primary Examiner—Malcolm A. Morrison
Assistant Examiner—Jerry Smith
Attorney, Agent, or Firm—W. C. Bernkopf; J. H. Beusse

[57] ABSTRACT

An improved digital differential analyzer (DDA) circuit wherein the output pulses, representing incremental changes of an integral, are generated at a rate as determined by a remainder size number. An integrand counter responds to pulses representing an incremental change of the integrand to keep track of the correct value of the integrand. Upon the occurrence of a pulse representing an incremental change of the variable of integration the present value of the integrand is added to the number stored in a remainder register thereby generating a new remainder number. The new remainder number is compared to the programmed remainder size number and if the new remainder is equal to or greater than the remainder size number a pulse representing an incremental change of the integral is generated and the new remainder is modified by subtracting the remainder size number from the new remainder number.

11 Claims, 7 Drawing Figures

FIG. 1  PRIOR ART DDA

DIGITAL DIFFERENTIAL ANALYZER

BACKGROUND OF THE INVENTION

This invention relates generally to improved digital differential analyzer (DDA) circuits and more particularly to DDA circuits in which the output pulse rate can be scaled by factors other than powers of the radix of the number system in use.

The operation of the DDA circuit is well known in the art and is described in U.S. Pat. No. 2,841,328 — Steele et al. In DDA computer circuits a variable is represented by a train of pulses having a rate proportional to the derivative of the variable. As described by Steele et al., the basic DDA circuit consists of three elements: a counter which responds to incremental changes, $\Delta v$, of the integrand to keep track of the current value of the integrand, V, a remainder register which stores the fractional portion of the integral, and an add-subtract circuit that adds the current value of the integrand to the fractional value of the integral in response to a unit change of the variable of integration, $\Delta u$. The overflow output of the remainder register represents a unit change, $\Delta z$, of the value of the integral. Neglecting the error due to the value of the remainder, the DDA output rate is given as:

$$\frac{\Delta z}{\Delta t} = \frac{V \Delta u}{M \Delta t}$$

The above equation states that the output rate of the DDA varies in direct proportion to the variable, V, and to the input rate of the variable of integration. The constant, M, is a scale factor which is dependent on the base of the arithmetic number system employed and the number of stages of the remainder register. Thus, if binary arithmetic is used and the remainder register has 12 stages, M equals $2^{12}$, or if decimal arithmetic is used and the remainder register has 5 decimal digits, M will equal $10^5$. Quite often the input rate of the variable of integration, U, is uniform and is determined by the time it takes to add the value of the integrand to the remainder register. The maximum value that V can have if the remainder register is a 12 stage binary register is $2^{12} - 1$ which means that the output rate can approach, but never equal or exceed the input rate of the variable of integration. As the value of V decreases, the output rate will decrease proportionally. If the value of the integrand V never exceeds $2^{11}$, the maximum output rate will not exceed 0.5 times the input rate. In certain applications it is desirable to maintain a high output pulse rate even though the average value of the integrand is small. One prior art approach for increasing the output rate involves taking the overflow signal, $\Delta z$, from a lower order stage of the remainder register. Thus, if the integrand, V, will never exceed $2^{11}$, and the overflow signal is taken from the 11th stage rather than the 12th stage of the remainder register, the output rate will again be almost equal to the input rate. In this manner it is possible to maintain an output rate of between 0.5 to 1.0 times the input rate depending on the value and range of the variable V. In certain applications it would be desirable to maintain the output pulse rate very close to the input pulse rate regardless of the value of the integrand V. For example, it is common to use DDA's as a function generator to numerically control a machine tool. Such a function generator is described in U.S. Pat. No. 3,449,554 — Kelling, in which the function generator accepts a train of pulses representing a desired contouring velocity and resolves the pulse train into two components of pulses, wherein each pulse represents a commanded incremental distance along one of two orthogonal axes. As is well-known in the art, if the output of the X integrator is applied to incrementally change the Y integrand, and vice versa, the function generator will command the machine tool to contour a circular arc. The initial value of the integrands are the X and Y arc center offsets from the starting point of the arc. Each output pulse represents an incremental distance of motion along the axis. Although the prior art approach of taking the overflow signal from a lower order stage of the remainder register will keep the actual contouring velocity within the range of 0.5 to 1.0 times the desired contouring velocity, it would be desirable to provide the desired contouring velocity for all values of x and y arc center offsets.

It is, therefore, one object of this invention to provide a DDA in which the output pulse rate can be selected to be other than a factor of the radix of the number system in use.

Another object of this invention to provide a DDA in which the output pulse rate is controlled independently of the input pulse rate and the size of the integrand.

Another object of this invention is to provide an improved function generator for use in a numerical control for a machine tool.

Another object of this invention is to provide a function generator for use in a numerical control for a machine tool in which the actual contouring velocity can be maximized regardless of the initial size of the X and Y arc center offsets.

And yet another object of this invention is to provide an improved method of generating the X and Y axis command pulses in a numerical contouring control for a machine tool.

SUMMARY OF THE INVENTION

The DDA circuit of this invention generates output pulses representing incremental changes of an integral, at a rate as determined by a remainder size number. An integrand counter responds to pulses representing an incremental change of the integrand to keep track of the correct value of the integrand. Upon the occurrence of a pulse representing an incremental change of the variable of integration, the present value of the integrand is added to the number stored in a remainder register thereby generating a new remainder number. The new remainder number is compared to the programmed remainder size number and if the new remainder is equal to or greater than the remainder size number a pulse representing an incremental change of the integral is generated and the new remainder is modified by subtracting the remainder size number from the new remainder number.

DESCRIPTION OF THE DRAWINGS

While the specification concludes with claims particularly pointing out and distinctly claiming that which is regarded as the present invention, the objects and advantages of this invention can be more readily ascertained from the following description of a preferred embodiment when read in conjunction with the accompanying drawings in which:

DETAILED DESCRIPTION

In a DDA computing circuit, the variables are represented by pulse trains in which each pulse represents an incremental change in the represented variable.

Figure 1:
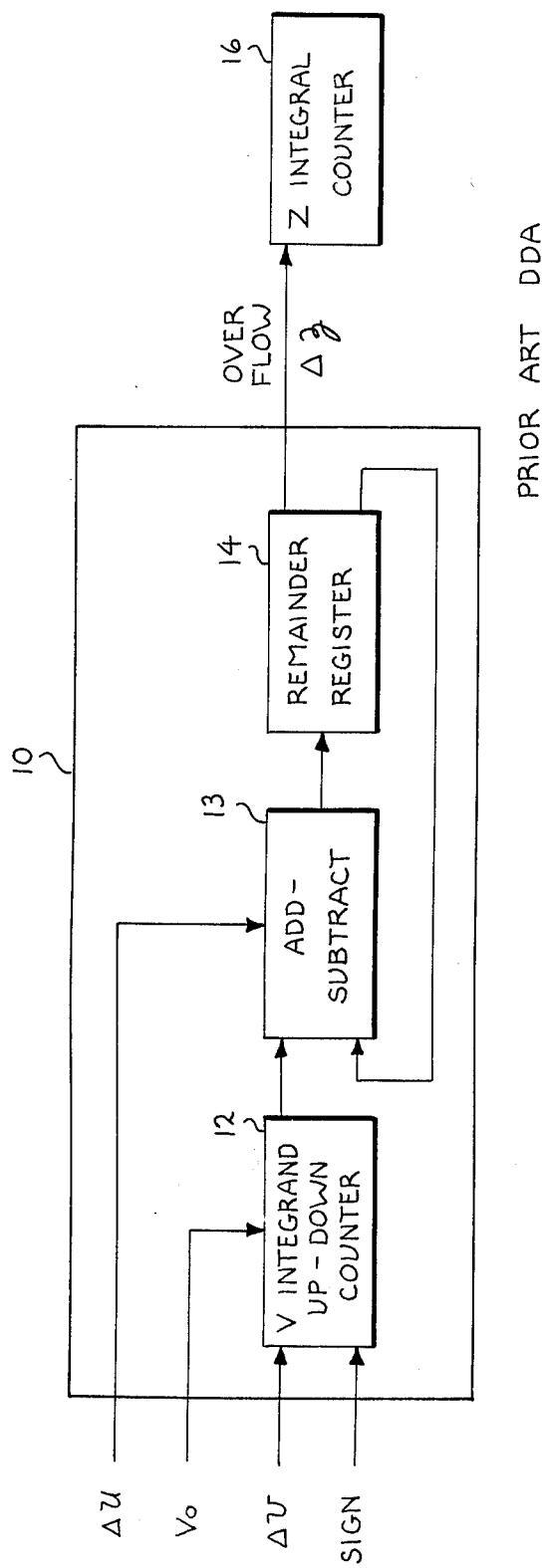
FIG. 1 is a block diagram of a prior art DDA circuit.

FIG. 1 is a block diagram of a prior art DDA circuit as described in U.S. Pat. No. 2,841,328 — Steele et al.

The prior art DDA 10 consists of an integrand up-down counter 12, an adder-subtractor 13 and a remainder register 14. The counter 12 responds to a pulse at the $\Delta v$ input, representing an incremental change of a variable, V, and to a SIGN signal indicating whether the incremental change represents an increase or a decrease in the value of the variable, to maintain the correct value of the variable V. Counter 12 also has the capability of being set to an initial value, $V_o$, of the variable V. Upon the occurrence of a pulse at the $\Delta u$ input, representing an incremental change of a variable U, adder-subtractor 13 will cause the present value of the variable V stored in counter 12 to be added to the old remainder portion of the integral stored in the remainder register 14 thereby generating a new remainder. Typically, remainder register 14 has the same number of stages as the integrand up-down counter 12. If as a result of adding the present value of the integrand to the old value of the remainder, the capacity of the remainder register 14 is exceeded an overflow signal, $\Delta z$, will be generated representing an incremental change in the value of the integral Z. Integral counter 16, responsive to the overflow signal, $\Delta z$, keeps track of the correct value of the integral Z. Neglecting the error resulting from the value of the accumulated remainder, the pulse rate at the $\Delta z$ output is given by the following equation:

$$\frac{\Delta z}{\Delta t} = \frac{V \Delta u}{M \Delta t}$$

where M depends on the number system that is employed and on the number of stages in remainder register 14. The maximum input pulse rate $\Delta u/\Delta t$ is usually determined by the time it takes to complete the addition of the integrand to the old remainder number. Since V must always be less than M, the maximum output pulse rate can almost equal the maximum input pulse rate. The above equation states that the output pulse rate is directly proportional to the value of the integrand and inversely proportional to the value of M.

If a binary number system is employed and the integrand counter 12 and the remainder register 14 each consist of 12 stages, M will equal $2^{12}$ or 4096. If in a given problem the maximum value of the integrand is 2047, the maximum output pulse rate will be limited to one-half the input pulse rate. One prior art approach for increasing the output pulse rate when it was known that the maximum value of the integrand was 2047 considered the remainder register 14 as an 11 stage register and generated an overflow signal, $\Delta z$, whenever the add-subtract circuit 13 caused the capacity of the 11 stage register to be exceeded. In this manner, even though the maximum value of the integrand is 2047, the maximum output pulse rate will now be almost equal to the input pulse rate. This prior art approach for increasing the output pulse rate is helpful in certain cases but is not much help if the maximum value of the integrand is 2100. In this case, the full capacity of the remainder register must be used and the maximum output rate will be slightly greater than one-half the input rate.

Figure 2:
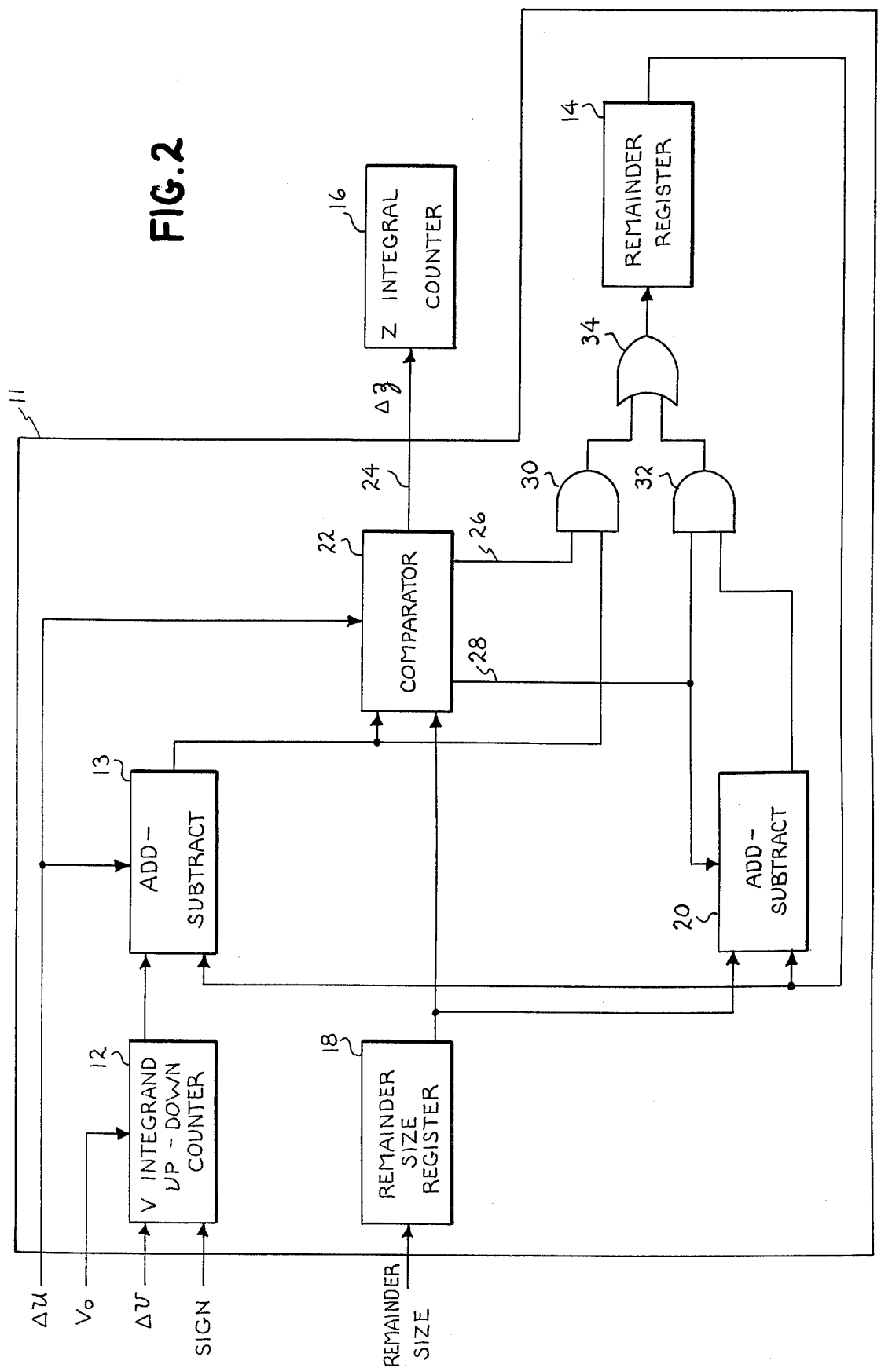
FIG. 2 is a block diagram of one embodiment of a DDA circuit of this invention.

For the sake of convenience, an element depicted in more than one Figure will retain the same element number in each Figure. FIG. 2 is a block diagram of the improved DDA circuit of this invention in which the maximum output pulse rate can be achieved for any maximum value of the integrand. Like the prior art conventional DDA circuit, the integrand is accumulated in up-down counter 12. A remainder size register 18 stores a number representing a value of the remainder, which, if exceeded will cause an overflow pulse, $\Delta z$, representing an incremental change in the value of the integral. Add-subtract circuit 13 responds to an incremental change of the variable U to cause the present value of the integrand stored in up-down counter 12 to be added to the old remainder portion of the integral stored in remainder register 14 and the result of the addition is stored in register 14 through AND gate 30 and OR gate 34. Comparator 22 is also responsive to the incremental change of the variable U and compares the new remainder generated by add-subtract circuit 13 with the number in the remainder size register 18 and generates an overflow signal, $\Delta z$, whenever the new remainder is greater than or equal to the remainder size number. Add-subtract circuit 20 responds to a signal on line 28 from the comparator 22 indicating that the new remainder is greater than the remainder size number and causes the remainder size number to be subtracted from the new remainder with the result of the subtraction stored in remainder register 14 through AND gate 32 and OR gate 34.

In operation, the V integrand counter 12 responds to a pulse at the $\Delta v$ input and counts up or down one count depending upon the SIGN signal. When a pulse appears at the $\Delta u$ input, add-subtract circuit 13 adds the present value of the integrand to the old remainder and stores the result in remainder register 14, while comparator 22 compares the new remainder with the number in the remainder size register 18. If the new remainder is less than the remainder size number, the DDA circuit is ready to respond to the next pulse at the $\Delta u$ input. If the new remainder is equal to or greater than the remainder size number, comparator 22 generates an overflow pulse at the $\Delta z$ output representing an incremental change of the value of the integral and enables add-subtract circuit 20 which subtracts the remainder size number from the new remainder and stores the result in the remainder register 14. The DDA circuit will then be ready to respond to the next pulse at the Δu input indicating another incremental change of the variable U. The number in the remainder size register 18 is chosen to be equal to or slightly greater than the maximum value of the integrand. Therefore, when the integrand is at the maximum value, the output pulse rate will equal or very nearly equal the input pulse rate.

Although the DDA of this invention has been described in terms of a specific embodiment thereof, it will be appreciated by those skilled in the art that the DDA can be implemented in a programmed digital computer. Thus, the remainder size register 18 and the remainder register 14 and the integrand storage could be computer memory locations, and the counting function of counter 12 as well as the functions performed by add-subtract circuits 13, 20, comparator 22 and logic gates 30, 32, 34 can be performed by appropriate arithmetic and logic instructions of the computer.

Figure 3:
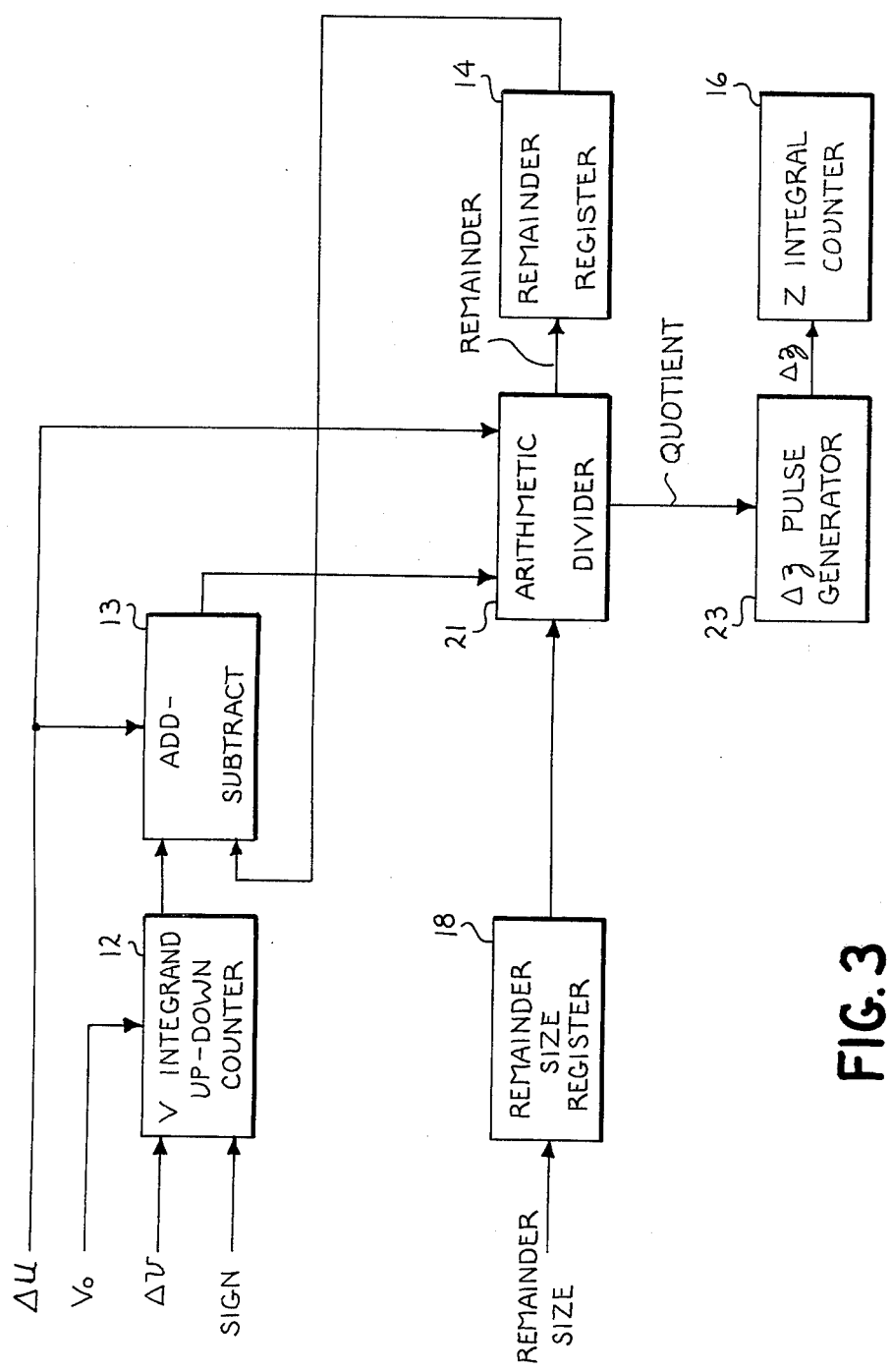
FIG. 3 is a block diagram of a second embodiment of a DDA circuit of this invention.

In the above discussion of FIG. 2 only that case has been considered in which the new remainder number cannot exceed two times the value of the remainder size number. If the new remainder number can exceed two times the value of the remainder size number, it will be necessary to perform a division operation. Thus, in the embodiment depicted in FIG. 3, the new remainder number generated by adder-subtractor 13 is applied to the dividend input of arithmetic divider 21 and the remainder size number is applied to the divisor input of arithmetic divider 21. The remainder output of the arithmetic divider 21 is applied to the remainder register 14 and the quotient output of arithmetic divider 21 is applied to a Δz pulse generator circuit 23 which generates the number of Δz pulses as determined by the value of the quotient.

It will be apparent to those skilled in the art that in certain DDA applications, either the remainder size number or the value of the integrand could be a constant and, therefore, could be manually established by means of switches.

The benefits of the DDA circuit of this invention is illustrated in the following description of a function generator used in a numerical contouring control for a machine tool.

Figure 4:
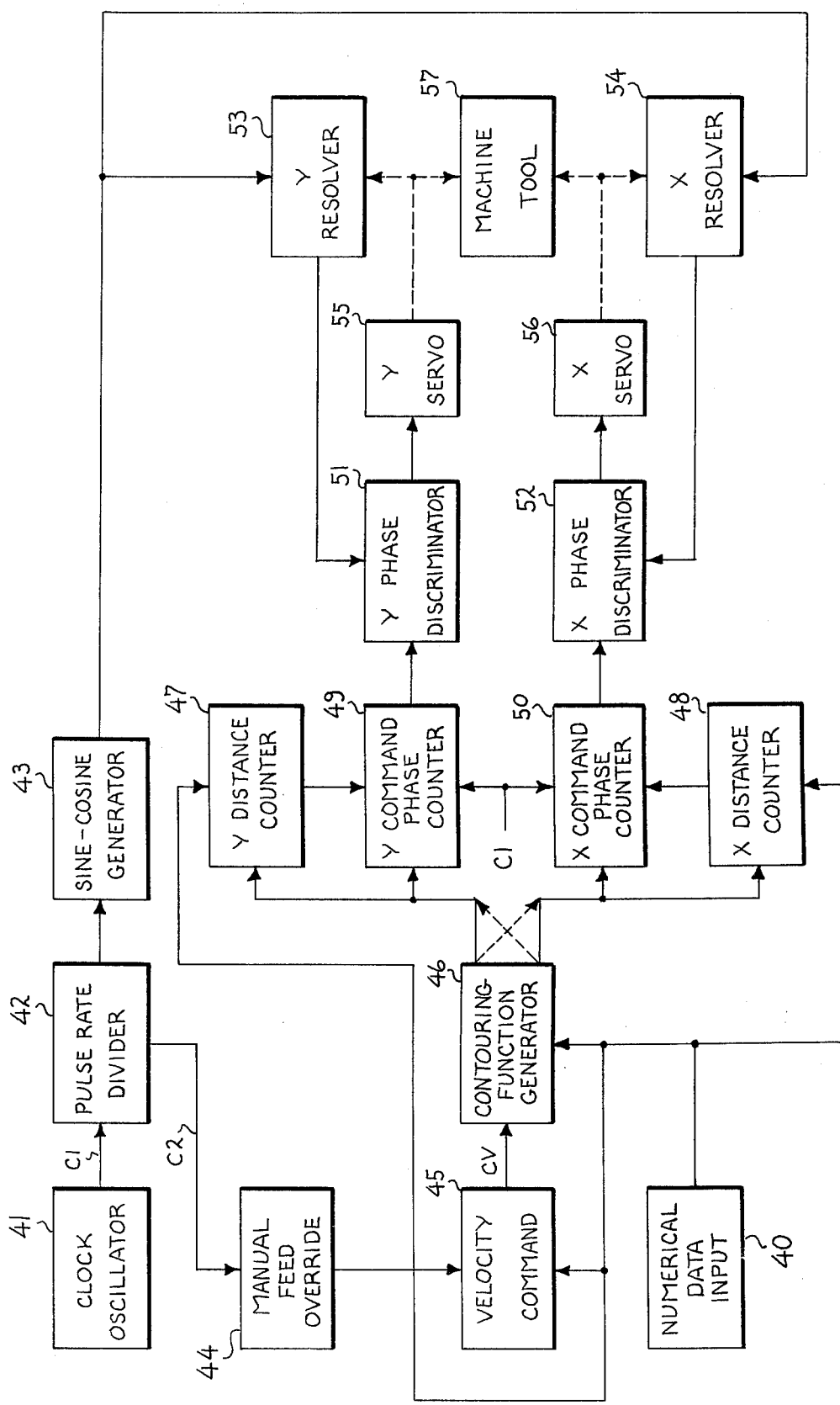
FIG. 4 is a block diagram of a numerical contouring control system in which the DDA circuit of this invention can be used.

FIG. 4 is a simplified block diagram of a typical numerical contouring control.

As illustrated, the numerical contouring control has been assumed to provide an X axis of motion and a Y axis of motion, these axes usually being mutually perpendicular, and generally lying in a plane. However, more or less axes of motion may be provided. The combined axes of motion provide the resultant motion. The system is provided with numerical command information from numerical data input unit 40. This information may be on a punched tape, punched card, magnetic tape, or on some other medium. Typically, this information indicates the desired speed of relative movement of a tool (such as a milling machine cutter) and a workpiece, and the desired direction of the path of relative movement of the tool and workpiece. The numerical data input unit 40 reads the commanded information and generates appropriate electrical signals for controlling the system and the relative movement of the tool and workpiece. The system utilizes pulses or trains of pulses which convey or indicate commanded increments of motion. As shown in the Figure, a clock oscillator 41 generates pulses at a C1 rate. This C1 rate is divided or reduced by a pulse rate divider 42 which produces pulses at various rates including the C2 rate indicated. The pulse rate divider 42 also supplies pulses to a sine and cosine generator 43 which produces sine and cosine signals for use in the servo portion of the system.

Pulses from the pulse rate divider 42 are supplied to a manual feed override 44 which enables an operator to manually control the speed of relative movement. Pulses from the manual feed override 44 are supplied to a velocity command 45 which modifies the incoming pulse rate from the manual feed override 44 by an amount called for by the numerical data input unit 40, and provides contouring velocity pulses, CV. These contouring velocity pulses, CV, occur at a rate which indicates the resultant velocity of relative motion of the tool and workpiece.

The contouring velocity pulses, CV, are supplied to a contouring function generator 46 which resolves these pulses into X and Y components of pulses wherein each pulse represents a commanded increment of motion along the axis. The pulse output rate will then be representative of the commanded velocity along the axis. These components of pulses are indicated as Δy and Δx and are applied to Y and X distance counters 47, 48 and to Y and X command phase counters 49, 50. As indicated by the dashed lines, the Δy pulses and Δx pulses can be respectively applied to Y and X distance counters 47, 48 or X and Y distance counters 48, 47. This provision is made so that the contouring function generator 46 need operate in only one quadrant, that is through an angle of 90 degrees. If additional quadrants of motion are desired, input information from the numerical data input unit 40 is supplied to the contouring function generator 46 and to the distance counters 47, 48 to effectively shift the function generator quadrant of operation to another quadrant. Thus motion in all four quadrants (through an angle of 360 degrees) can be provided. Information is supplied to the distance counters 47, 48 to limit the distance traveled in a given operation to some predetermined absolute point so that errors do not accumulate. Thus, after the predetermined number of Δy or Δx pulses have passed through the respective distance counters, the distance counters prevent further pulses from passing through to the command phase counters 49, 50 and stop motion along their respective axes. Each command phase counter 49, 50 generates a signal whose phase varies in proportion to the number of Δx or Δy pulses applied to its input. The phase varying output signals of command phase counters 49, 50 are applied to respective Y and X phase discriminators 51, 52.

The phase discriminators 51, 52 compare the phases of signals from the respective Y and X command phase counters 49, 50 with the phases of signals from Y and X resolvers 53, 54, and produce control signals which are applied to Y and X servos 55, 56. These servos 55, 56 effect motion of a machine tool 57 in the Y and X directions as indicated by the dashed lines. These Y and X servos 55, 56 also move or operate the Y and X resolvers 53, 54. As these resolvers 53, 54 move, the respective phases of their output signals shift. As long as a difference in phase exists between the two signals supplied to a phase discriminator, motion is called for. This motion moves the machine tool and the resolvers. If the system is operating properly, no further motion signals are produced after the time that the machine tool reaches its commanded or desired position.

Figure 5:
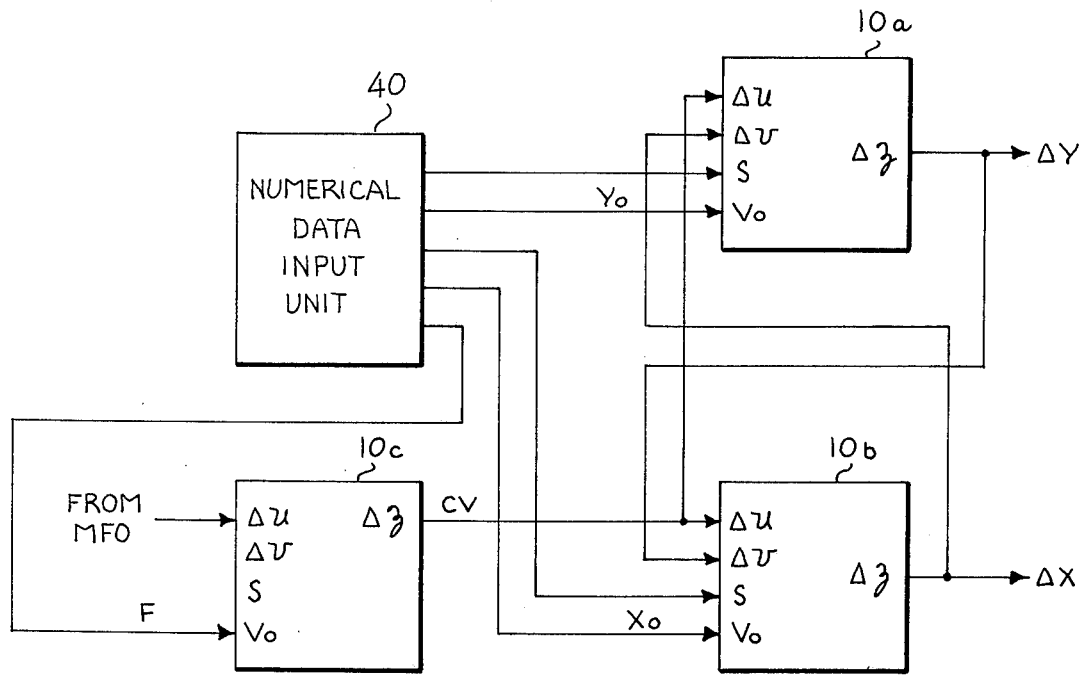
FIG. 5 is a block diagram of the velocity control and function generator portions of the numerical contouring control of FIG. 4 implemented with the prior art DDA circuits.

FIG. 5 shows how the prior art DDA circuits of FIG. 1 can be connected to generate the CV pulse train and to generate the $\Delta y$ and $\Delta x$ pulse trains to accomplish the contouring of a circular arc. The pulse train from the manual feed override 44 is applied to the $\Delta u$ input of DDA circuit 10C. The numerical data input unit 40 causes a constant, F, to be placed in the integrand up-down counter of DDA circuit 10C. The output rate of DDA circuit 10C will then be directly proportional to the ratio of F to M. The $Y_o$ and $X_o$ offset distances from the starting point of the arc to the center of the arc are stored in the respective integrand up-down counters of DDA circuits 10A and 10B. The sign inputs of DDA circuits 10A and 10B are also controlled by the numerical data input unit 40 depending on the quadrant of operation and the direction of rotation. For a given circular arc one integrand will always be counted down and the other integrand counted up. The $\Delta y$ output of DDA circuit 10A is applied to the $\Delta v$ input of DDA circuit 10B and the $\Delta x$ output of DDA circuit 10B is applied to the $\Delta v$ input of DDA circuit 10A.

If it is assumed that the CV pulse rate is at the maximum value, Vmax, the actual commanded contouring velocity will be some fraction of the maximum rate as determined by the X and Y radius offsets programmed into the DDA integrand counters. As mentioned before, if binary arithmetic is employed, it is possible to take the overflow or $\Delta z$ output of DDA circuit 10 from a lower order stage and thereby increase the output pulse rate of the DDA circuit 10. If this technique is used in the prior art function generator, the relationship of the actual commanded velocity to the theoretical maximum velocity is given by the solid line of FIG. 7. Thus, if the contouring radius is $2^{(n+3)}$ units, the contouring velocity will almost equal the maximum value Vmax. As the radius decreases, the actual commanded velocity proportionally decreases. Once the radius falls below $2^{(n+2)}$, the overflow, $\Delta z$, output can be taken from the next lower stage and the maximum velocity Vmax can again almost be achieved. As the radius continues to decrease, the overflow output can be similarly taken from successive lower order stages.

Figure 7:
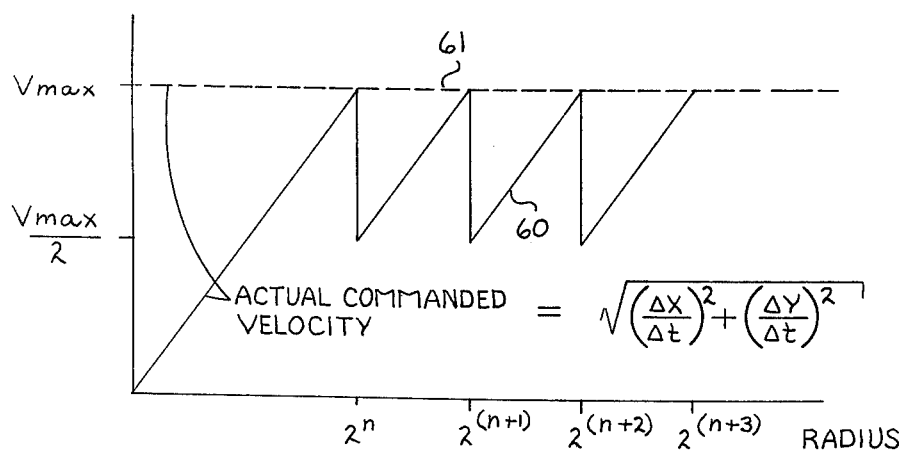
FIG. 7 is a graph comparing the values of contouring velocity theoretically obtainable using prior art DDA circuits with that obtained when using the DDA circuits of this invention.
Figure 6:
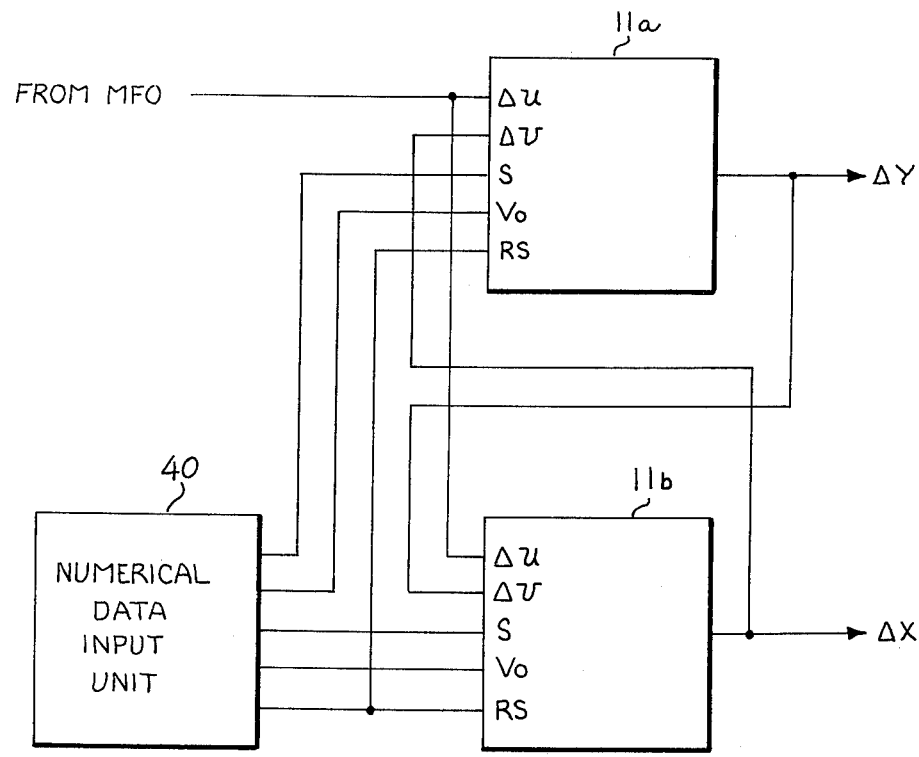
FIG. 6 is a block diagram of the velocity control and function generator portions of the numerical contouring control of FIG. 4 implemented with the DDA circuits of this invention.

FIG. 6 shows how the DDA circuits of this invention can be connected to generate $\Delta y$ and $\Delta x$ pulse trains to accomplish the contouring of circular arcs at a desired velocity. Like the function generator of FIG. 4, numerical data input unit 40 programs the radius offset distances $X_o$ and $Y_o$ into the integrand counters and also controls the sign input of DDA circuits 11A and 11B. The pulse train from manual feed override 44 is applied to the $\Delta u$ input of DDA circuits 11A and 11B. The $\Delta x$ output pulse train of DDA circuit 11B is fed into the $\Delta v$ pulse input of DDA circuit 11A and the $\Delta y$ output pulse train of DDA circuit 11A is fed into the $\Delta v$ pulse input of DDA circuit 11B in order to generate a circular arc. The numerical data input unit 40 programs the remainder size number into the remainder size registers of DDA circuits 11A and 11B. If the pulse rate from the manual feed override 44 is the maximum rate and the remainder size number is selected to be equal to the radius of the contouring arc, the actual contouring velocity will equal the maximum value, and the programmed remainder size number will be inversely proportional to the velocity along the path and directly proportional to the radius or the slope length, wherein the radius is equal to the square root of the sum of the squares of the individual integrand values. In FIG. 7, dashed line 61 shows a plot of actual commanded velocity versus radius when DDA circuits of this invention are used to implement the function generator of a numerical contouring control for a machine tool. The curve shows that the maximum contouring velocity can be achieved for any value of the contouring radius.

While the present invention has been described with reference to a specific embodiment thereof, it will be obvious to those skilled in the art that various changes and modifications may be made without departing from the invention in its broader aspects. For example, as is well known in the art, if the numbers programmed into the X and Y integrand counters are not altered by the $\Delta y$ and $\Delta x$ output pulses, the function generator will command a linear path having a slope as determined by the numbers stored in the X and Y integrand counters. Furthermore, by controlling the modification of the X and Y integrand counters, other contouring shapes, e.g., parabolas, can be generated.

It is contemplated in the appended claims to cover all variations and modifications of the invention which come within the true spirit and scope of the invention.

What is claimed as new and desired to be secured by Letters Patent of the United States is:

1. A digital differential analyzer circuit for generating an output signal representing an incremental change of an integral scaled by a factor other than powers of the radix of the number system employed comprising:
    a. means for storing a first digital number representing the current value of a first variable;
    b. means for storing a second digital number representing a selectable remainder size;
    c. a memory register for storing a new remainder number;
    d. arithmetic and logic means responsive to an input signal representing an incremental change of a second variable for algebraically combining the first digital number and the number in the memory register to form a new remainder number, for comparing the magnitude of the new remainder number to the magnitude of the selected remainder size number, for causing said new remainder number to be stored in the memory register if the magnitude of the new remainder number is less than the magnitude of the remainder size number, for forming the difference between the magnitude of the new remainder number and the remainder size number if the magnitude of the new remainder number is greater than the magnitude of the remainder size number, and for storing said difference in the memory register; and
    e. circuit means for generating said output signal when the magnitude of the new remainder number is greater than the magnitude of the remainder size number.

2. A digital differential analyzer as recited in claim 1 wherein the input signal is a pulse train in which each pulse represents an incremental change of the second variable and the output signal is a pulse train in which each pulse represents an incremental change of the integral.

3. A digital differential analyzer circuit for generating an output signal representing an incremental change of an integral scaled by a factor other than powers of the radix of the number system employed comprising:
    a. first memory register for storing a digital number representing the current value of a first variable;
    b. second memory register for storing a number representing a selectable remainder size;
    c. third memory register for storing a new remainder number;

d. arithmetic and logic means responsive to an input signal representing an incremental change of a second variable for algebraically combining the numbers in the first and third registers to form a new remainder number, for comparing the magnitude of a new remainder number to the magnitude of the selected remainder size number, for causing said new remainder number to be stored in the third register if the magnitude of the new remainder number is less than the magnitude of the remainder size number, for forming the difference between the magnitude of the new remainder number and the remainder size number if the magnitude of the new remainder number is greater than the magnitude of the remainder size number, and for storing said difference in the new remainder register; and e. circuit means for generating said output signal when the magnitude of the new remainder number is greater than the magnitude of the remainder size number.

4. An improved digital differential analyzer for generating a signal representing the differential of an integral scaled by a factor other than powers of a radix of the number system in use, the digital analyzer having an integrand memory register for accumulating the present value of a first variable, a remainder memory register, and adder-subtractor means, responsive to a signal representing an incremental change of a second variable, for adding the number in the integrand register to the number in the remainder register to form a new remainder number, wherein the improvement comprises:

a. scaling memory register for storing a number representing a selected remainder size;

b. logic circuit means for causing the difference between the magnitude of the new remainder number and the magnitude of the remainder size number to be formed and stored in the remainder memory register when the magnitude of the new remainder number is equal to or greater than the magnitude of the selected remainder size number; and c. circuit means for generating said differential signal when the magnitude of the new remainder is equal to or greater than the magnitude of the selected remainder size number.

5. A digital differential analyzer circuit for generating an output signal representing an incremental change of an integral scaled by a factor other than powers of the radix of a number system comprising:

a. means for storing a first digital number representing the current value of a first variable;

b. means for storing a second digital number representing a selectable remainder size;

c. a memory register for storing a new remainder number;

d. arithmetic and logic means responsive to a signal representing an incremental change of a second variable for algebraically combining the first and third digital numbers to form a new number, for dividing the new number by the selected remainder size number to generate a quotient and a new remainder number, and for storing the new remainder number in the memory register; and e. circuit means responsive to the quotient for generating said output signal.

6. An improved digital differential analyzer for generating an output pulse representing the differential of an integral scaled by a factor other than powers of a radix of the number system in use, the digital analyzer having an integrand memory register for accumulating the present value of a first variable, a remainder memory register, and adder-subtractor means, responsive to a pulse representing an incremental change of a second variable, for adding the number in the integrand register to the number in the remainder register to form a new remainder number, wherein the improvement comprises:

a. scaling memory register for storing a number representing a selected remainder size;

b. logic circuit means for causing the difference between the magnitude of the new remainder number and the magnitude of the remainder size number to be formed and stored in the remainder memory register when the magnitude of the new remainder number is equal to or greater than the magnitude of the selected remainder size number; and c. circuit means for generating said output pulse when the magnitude of the new remainder is equal to or greater than the magnitude of the selected remainder size number.

7. A method of generating an output signal representing the differential of an integral scaled by a factor other than a power of the radix of a number system comprising the steps of:

a. storing a digital number representing the value of a first variable in a first memory register;

b. storing a digital number representing a selected remainder size in a second memory register;

c. storing a digital number representing a new remainder in a third memory register;

d. algebraically combining, in response to a signal representing an incremental change of a second variable, the numbers in the first and third memory registers to form a new number;

e. dividing the new number by the magnitude of the selected remainder size number to generate a quotient and a new remainder number;

f. storing the new remainder in the third memory register; and g. generating said output signal as determined by the quotient number.

8. A method of generating an output signal representing the differential of an integral scaled by a factor other than a power of the radix of a number system comprising the steps of:

a. storing a digital number representing the value of a first variable in a first memory register;

b. storing a digital number representing a selected remainder size number in a second memory register;

c. storing a digital number representing a new remainder number in a third memory register;

d. algebraically combining, in response to a signal representing an incremental change of a second variable, the numbers in the first and third memory registers to form a new remainder number;

e. comparing the magnitude of the new remainder number to the magnitude of the selected remainder size number;

f. storing the new remainder number in the third memory register if the magnitude of the new remainder number is less than the magnitude of the remainder size number; and g. if the magnitude of the new remainder number is equal to or greater than the remainder size number;

i. forming the difference between the magnitude of the new remainder number and the remainder size number;
ii. storing said difference in the third memory register; and
iii. generating said output signal.

9. In a numerical control for producing relative motion of a tool and workpiece along a commanded path in response to control numbers, generated by a control unit, representing the instantaneous slope and velocity along the commanded path, a function generator for generating twopulse trains wherein each pulse represents an increment of motion along an orthogonal axis, said function generator comprising:
 a. first and second memory registers for storing first and second control numbers having a ratio proportional to the instantaneous slope of commanded path;
 b. third and fourth memory registers for storing first and second new remainder numbers;
 c. fifth memory register for storing a third control number inversely proportional to the velocity along the path;
 d. arithmetic and logic means, responsive to a control signal,
  i. for algebraically combining the numbers in the first and third memory registers and the numbers in the second and fourth memory registers for generating respectively first and second new remainder numbers;
  ii. for comparing the magnitude of the first and second new remainder numbers to the third control number;
  iii. for storing the first new remainder number in the third memory register if the first new remainder number is less than the third control number;
  iv. for storing the second new remainder number in the fourth memory register if the second new remainder number is less than the third control number;
  v. for generating a pulse representing an increment of motion along one of said orthogonal axes, forming the difference between the magnitude of the first new remainder number and the third control number, and storing said difference in the third memory register if the first new remainder number is equal to or greater than the third control number; and
  vi. for generating a pulse representing an increment of motion along the other of said orthogonal axes, forming the difference between the magnitude of the second new remainder number and the third control number, and storing said difference in the fourth memory register if the second new remainder number is equal to or greater than the third control number.

10. A function generator as recited in claim 9 wherein the number in the first memory register is altered in response to certain of said pulses representing an increment of motion along said other orthogonal axis and wherein the number in the second memory register is altered in response to certain of said pulses representing an increment of motion along said one orthogonal axis whereby the relative motion of the tool and workpiece follows a non-linear path.

11. A function generator as recited in claim 9 wherein one is added to the number in the first memory register in response to each pulse representing an increment of motion along said other orthogonal axis and wherein one is subtracted from the number in the second memory register in response to each pulse representing an increment of motion along said one orthogonal axis whereby the relative motion of the tool and workpiece follows a circular path.

* * * * *